United States Patent [19]

Suzuki

[11] Patent Number: 4,619,026

[45] Date of Patent: Oct. 28, 1986

[54] APPARATUS FOR ASSEMBLING CABLE DRUM

[75] Inventor: Yoshiaki Suzuki, Yokohama, Japan

[73] Assignee: Toko Kogyo Kabushiki Kaisha, Tokyo, Japan

[21] Appl. No.: 783,994

[22] Filed: Oct. 4, 1985

[30] Foreign Application Priority Data

Aug. 31, 1985 [JP] Japan .............................. 60-190966

[51] Int. Cl.⁴ ............................................. B23K 37/04
[52] U.S. Cl. .................................... 29/256; 29/281.5
[58] Field of Search ................... 29/256, 281.1, 281.3, 29/281.4, 281.5, 282, 159.1, 159.3; 228/6.1, 49.1; 269/43, 41, 71, 289 MR

[56] References Cited

U.S. PATENT DOCUMENTS

| 3,734,387 | 5/1973 | Sannipoli | 228/6.1 |
| 4,146,162 | 3/1979 | Skakunov | 228/6.1 |
| 4,231,143 | 11/1980 | Pohto et al. | 29/281.5 |
| 4,295,257 | 10/1981 | Strohs | 29/281.5 |

Primary Examiner—Robert C. Watson
Attorney, Agent, or Firm—Armstrong, Nikaido, Marmelstein & Kubovcik

[57] ABSTRACT

An apparatus for assembling a cable drum having a winding drum and flange plates with ribs mounted on the ends thereof. The apparatus comprises a pair of pressing plates, each pressing plate having mounting grooves for engaging the ribs on the flange plates, the pressing plates being positioned to face one another with the centers aligned on a central axis, wherein the pressing plates are movable in the axial direction with respect to one another. An annular holder engages the winding drum and positions the winding drum such that the axis thereof is aligned with the center axis of the pressing plates, wherein the annular holder includes at least two segment members, the segment members being movable with respect to one another.

3 Claims, 11 Drawing Figures 4,619,026

APPARATUS FOR ASSEMBLING CABLE DRUM

BACKGROUND OF THE INVENTION

1. Field of the Invention

This invention relates to an apparatus for assembling a cable drum used for winding of an elongated wire, an electric cable, an optical cable or the like.

2. Description of the Prior Art

Japanese Pat. No. 1089799 discloses in FIG. 1 thereof, a steel flange plate member a for a cable drum which has ribs b formed on its outside surface for increasing the mechanical strength thereof. The flange plate member a is formed into a flange plate i, as shown in FIG. 2, by welding an outer ring c thereto and by attaching an axial metallic member d to a center opening thereof. When a cable drum is to be assembled therefrom, the flange plate i is placed horizontally such that its inner surface is directed upwards, and a steel winding drum e is placed thereon and is welded at f for obtaining a sub-assembly g as shown in FIG. 3. Thereafter, this sub-assembly g is turned over and is placed on another flange plate i and is welded at h as shown in FIG. 4.

In the assembling of a cable drum by welding the winding drum e to the flange plates i as described, there is the problem that the attached positions of the flange plates i on both sides of the winding drum e may be out of alignment, and it takes a long time to assemble the drum. Further, a force is required to turn over the sub-assembly g. These problems result in a lowering of the workability.

Additionally, if the winding drum e of the resultant cable drum is not perfectly circular, the rotational balance thereof is spoiled when winding up a wire member at a high speed. Thus, it is desirable that the welding of the winding drum should be carried out while the winding drum is kept in the form of a perfect circle.

SUMMARY OF THE INVENTION

An object of the present invention is to provide an apparatus whereby the relative position of each flange plate of a winding drum can be accurately and automatically set such that the centers of the flange plates are in alignment with each other. Thus, a cable drum having a good rotational balance can be simply and easily assembled.

Another object of this invention is to provide an apparatus whereby a flange plate can be attached to a winding drum while the winding drum is given perfect circular form.

The present invention is directed to an apparatus for assembling a cable drum having a winding drum and flange plates with ribs mounted on the ends thereof. The apparatus comprises a pair of pressing plates, each pressing plate having mounting grooves for engaging the ribs on the flange plates, the pressing plates being positioned to face one another with the centers aligned on a central axis, wherein the pressing plates are movable in the axial direction with respect to one another. An annular holder engages the winding drum and positions the winding drum such that the axis thereof is aligned with the center axis of the pressing plates, wherein the annular holder includes at least two segment members, the segment members being movable with respect to one another. A first movable means is coupled to a first of the segment members for rotating the first segment member about an axis parallel to the center axis and a second movable means is coupled to a second of the segment members for moving the second segment member in a direction perpendicular to the center axis. The first and second movable means thus move the first and second segment members together to form the annular holder.

DETAILED DESCRIPTION OF THE PREFERRED EMBODIMENT

Figure 5:
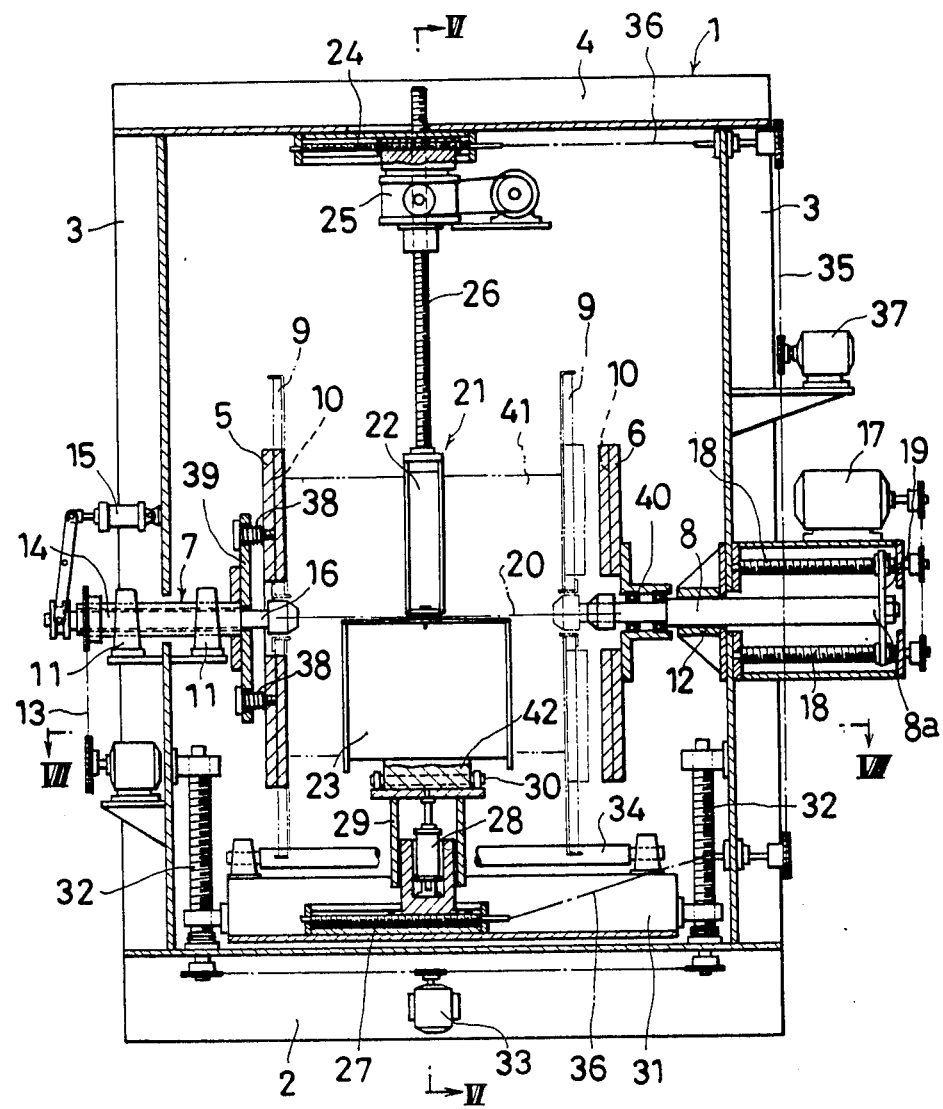
FIG. 5 is a front view of the preferred embodiment of a cable drum assembly apparatus of the present invention.
Figure 6:
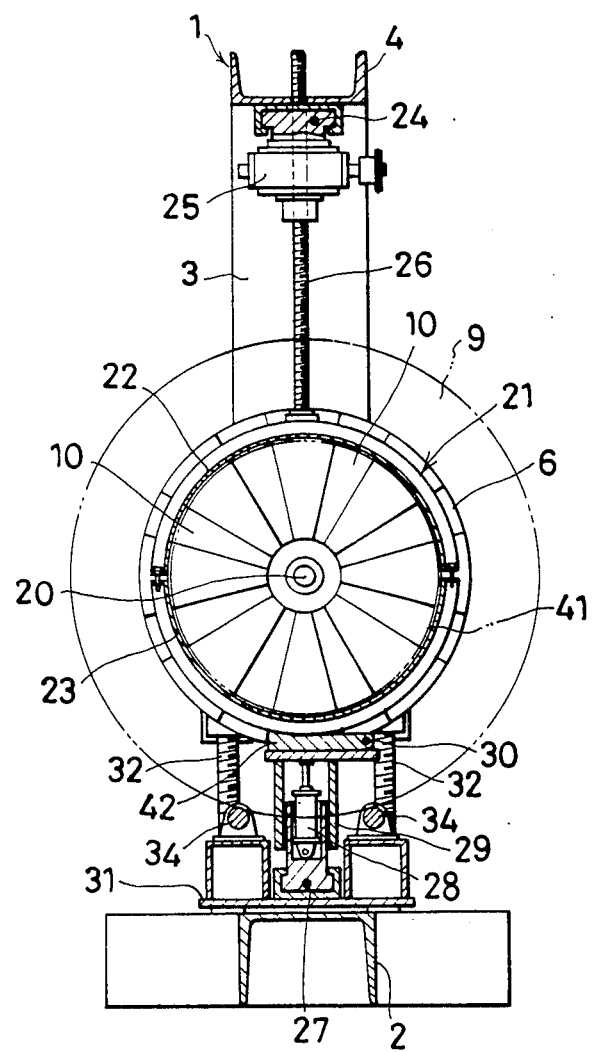
FIG. 6 is a sectional view taken along the lines VI—VI in FIG. 5.
Figure 7:
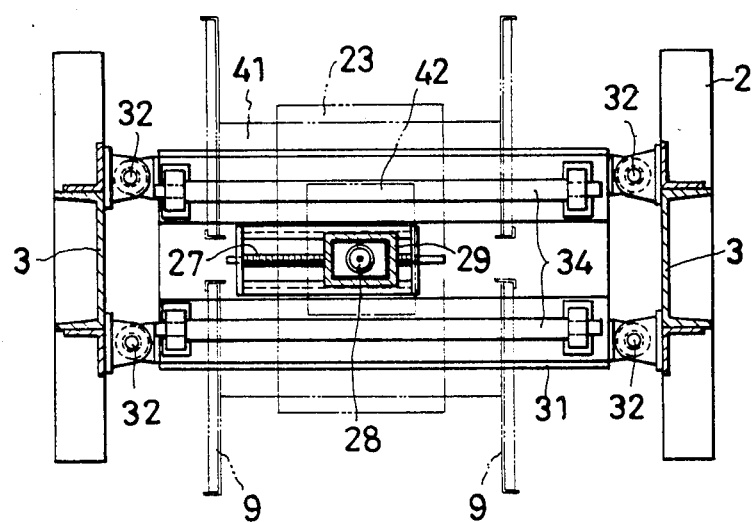
FIG. 7 is a sectional view taken along the line VII—VII in FIG. 5.

Referring to FIGS. 5-7, a machine frame 1 for a cable drum assembling apparatus is provided which comprises a pair of right and left posts 3 provided on a machine base 2. A crossbeam is located above the machine base 2 across the upper portions of the posts 3. Disk shaped pressing plates 5 and 6 on respective supporting shafts 7 and 8 attached to the central portions thereof, face the left and right posts 3 respectively. As shown clearly in FIG. 6, each of the facing inner surfaces of the pressing plates 5 and 6 is formed with mounting grooves 10 for mounting on reinforcing ribs 9a of a flange plate 9 as mentioned above.

The respective supporting shafts 7 and 8 are rotatably supported through respective bearings 11 and 12 mounted on the posts 3. The supporting shaft 7 comprises an outer sleeve 14 which is rotated by a chain 13, and an inner shaft 16 inserted through the interior of the outer sleeve 14. The inner shaft 16 is reciprocable by means of a cylinder 15. The supporting shaft 8 is reciprocable in the bearing 12 such that an outer end portion 8a thereof is in engagement with a movable member 19 which is in threaded engagement with a pair of feed screws 18, which are driven by an electric motor 17 located outside the post 3.

The two pressing plates 5 and 6 are disposed such that their respective centers are in alignment with one another on their single common center axis 20. Additionally, the annular holder 21 is located between the two pressing plates 5 and 6 and is also disposed such that the center thereof is coincident with the center axis 20 between the centers of the pressing plates 5 and 6. The annular holder 21 is divided into upper and lower semicircular segmental members 22 and 23 so that a winding drum 41 may be held under pressure between the segmental members 22 and 23 in order to be shaped into a perfect circular drum. The upper segmental member 22 is attached to a movable member comprising a worm gear 26 extending from a worm box 25 which is movable along the crossbeam 4 by a reciprocating means such as a feed screw 24, a cylinder or the like provided on the beam 4. The lower segmental member 23, which is larger in width than the upper segmental member 22, is combined with a swingable member 42 which is swingable towards the front of the machine frame 1, through a shaft 30, on a base plate 29 which is movable to the right and left along the machine base 2 by means of a feed screw 27 and is movable vertically by a cylinder 28. The base plate 29 is attached to an elevating base 31 which is movable upwards and downwards, by an electric motor 33, on the guide rods 32 provided on the posts 3 of the machine frame 1. The elevating base 31 has, on its upper surface, a pair of rotatable under rollers 34 for supporting the circumferential edge of the flange plate 9.

The feed screw 24 for moving the segmental member 22 and the feed screw 27 for moving the segmental member 23 are interconnected through a chain 35 and a universal joint 36 so that the two screws 24 and 27 may be rotated synchronously by an electric motor 37, and thus, the two segmental members 22 and 23 always face one another.

The pressing member 5 on one side is attached, through a spring means 38, to a back plate 39 fixed to the outer tube 14 of the supporting shaft 7, and the pressing plate 6 on the other side is supported through a bearing 40 on the supporting shaft 8.

Figure 1:
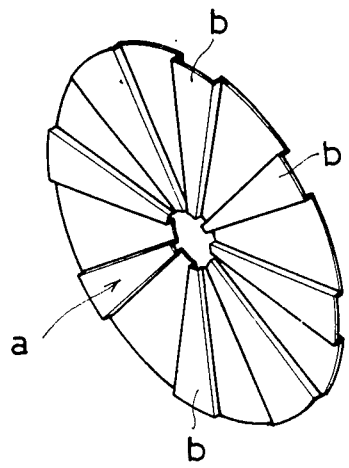
FIG. 1 is a perspective view of a flange plate member for a cable drum.
Figure 2:
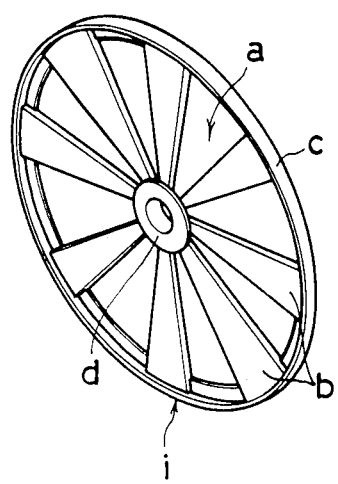
FIG. 2 is a perspective view of a flange plate thereof.
Figure 3:
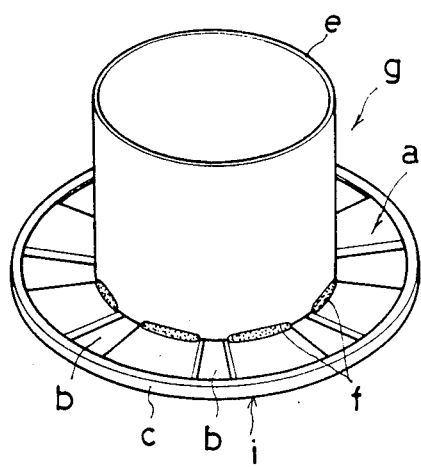
FIGS. 3 and 4 are perspective views showing a conventional cable drum manufacturing process.
Figure 4:
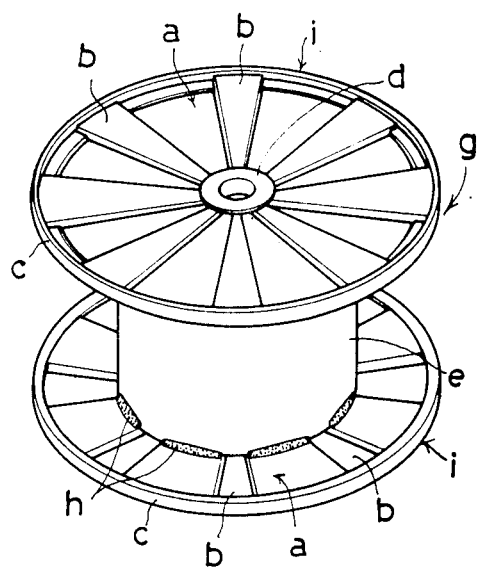

The flange plate member of the flange plate 9 is made of a structural material and has ribs on its outside surface, which are similar in shape to the one shown in FIG. 1. Consequently, the flange plate is comparatively large in strength. However, the winding drum 41 is produced by welding a thin steel plate into a cylinder and consequently, it is easy to deform. Thus, for assembling a cable drum having a good rotational balance, it is necessary that the winding drum be accurately kept in a perfect circular cylindrical shape and the center of the flange plate and the center of the winding drum be coincident with one another. This requirement can be met by using the preferred embodiment of the present invention as follows.

Figure 8:
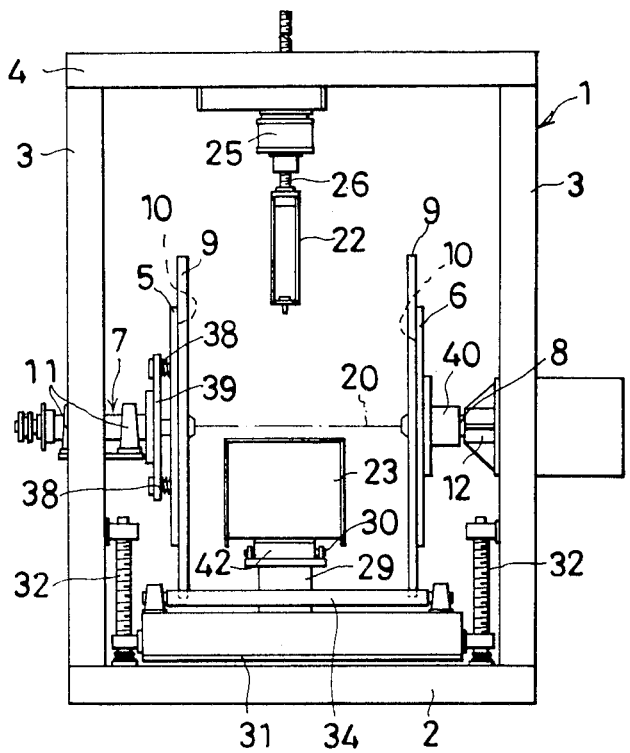
FIGS. 8-11 are respective explanatory diagrams showing the operating conditions of the apparatus of the present invention.

First, as shown in FIG. 8, the two flange plates 9 are attached to the respective pressing plates 5 and 6 such that the respective ribs formed on the outer surfaces thereof are mounted in the respective mounting grooves 10 of the pressing plates 5 and 6. In order to facilitate the mounting, each flange plate 9 is placed vertically on the under rollers 34 and is then slid towards the corresponding pressing plate 5 or 6 so that the ribs thereof move into the corresponding mounting grooves 10.

Figure 9:
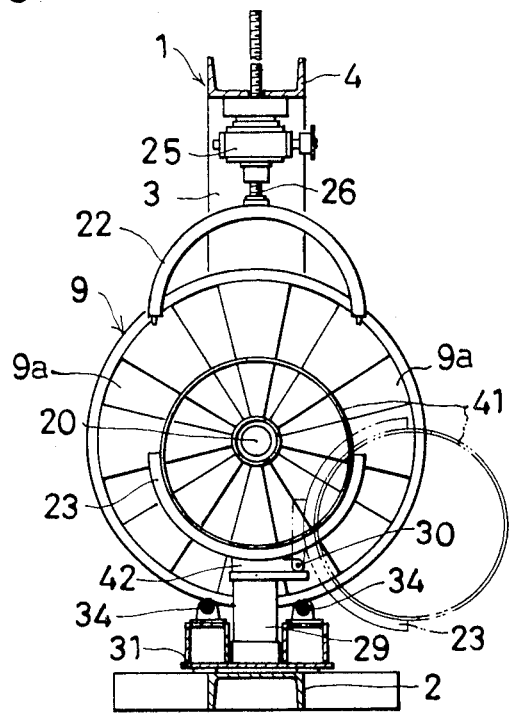
Figure 10:
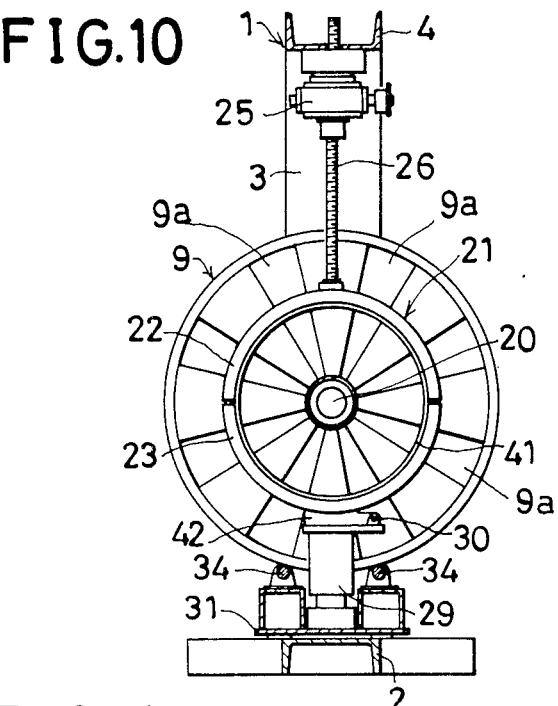
Figure 11:
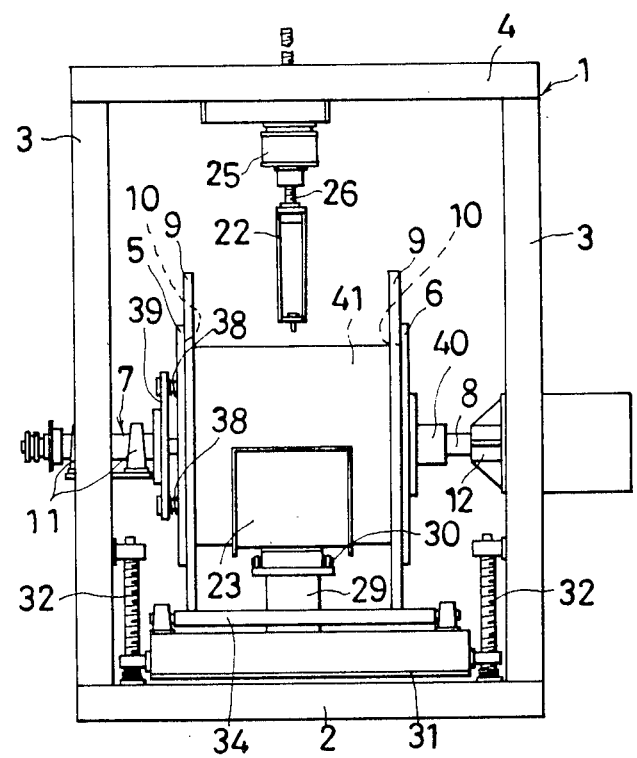

Next, as shown by dotted lines in FIG. 9, the winding drum is mounted on the lower segmental member 23 which has been swung forwards, and thereafter, the member 23 is swung rearwards to be positioned as shown by the solid lines. The upper segmental member 22 is then lowered by the worm gear 26, and the lower segmental member 23 is elevated by the cylinder 28, so that the annular holder 21, which is formed by the upper and lower segmental members 22 and 23, holds the winding drum 41 under pressure and forms the drum 41 into a regular, perfect circular cylinder as shown in FIG. 10.

Next, the pressing member 6 on one side is moved towards the pressing plate 5 on the other side by advancing the supporting shaft 8, so that the flange plates 9 are brought into abutment with the opposite ends of the winding drum 41. The center of the annular holder 21 has previously been set to be coincident with the center axial line 20 between the centers of the two pressing plates 5 and 6, and thereby, the center of the winding drum 41 is in alignment with the centers of the flange plates 9. After the flange plates 9 are brought into pressure contact with the opposite ends of the winding drum 41, the segmental members 22 and 23 of the annular holder 21 are separated from each other and the contacting portions of the flange plates 9 and the winding drum 41 are welded together while they are being rotated, and thus, the cable drum is assembled.

The apparatus can be modified by replacing the feed screws 24 and 27 or the supporting members 7 and 8 by respective piston rods of oil-pressure operated type cylinders, for example.

Thus, according to the present invention, pressing plates, each having mounting grooves adapted to be mounted on the ribs of flange plates, are so disposed on the sides of a machine frame facing one another and are movable towards one another, and a dividable annular holder is provided therebetween to hold a winding drum under pressure such that the flange plates and the winding drum can be assembled together with the centers thereof in alignment. In addition, the winding drum can be regulated in shape into a perfect cylinder by the annular holder. Consequently, a cable drum having a good rotational balance can be manufactured with high efficiency.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for assembling a cable drum having a winding drum and flange plates with ribs mounted on the ends thereof, said apparatus comprising a pair of pressing plates, each pressing plate having mounting grooves for engaging the ribs on the flange plates, said pressing plates being positioned to face one another with the centers thereof aligned on a central axis, wherein said pressing plates are movable in the axial direction with respect to one another; and annular holder means for engaging the winding drum and positioning the winding drum such that the axis thereof is aligned with said center axis of said pressing plates, wherein said annular holder means includes at least two segment members, said segment members being movable with respect to one another.

2. An apparatus as set forth in claim 1, including segment moving means coupled to one of said segment members for moving said segment member in a plane perpendicular to said center axis of said pressing plates.

3. An apparatus as set forth in claim 1, including a first movable means coupled to a first of said segment members for rotating said first segment member about an axis parallel to said center axis and a second movable means coupled to a second of said segment members for moving said second segment member in a direction perpendicular to said center axis, wherein said first and second movable means move said first and second segment member together to form said annular holder means.

* * * * *